United States Patent [19]
Bieber

[11] 3,757,600
[45] Sept. 11, 1973

[54] AUTOMATIC TRANSMISSION SHIFTER HAVING CONVENTIONAL MODE AND RACING MODE OPERATIONAL CAPABILITIES

[76] Inventor: William J. Bieber, R.D. No. 1, Pipersville, Pa. 18947

[22] Filed: May 15, 1972

[21] Appl. No.: 253,580

[52] U.S. Cl............................................. 74/473 R
[51] Int. Cl............................................. G05g 7/08
[58] Field of Search................. 74/473 R, 475, 476, 74/477

[56] References Cited
UNITED STATES PATENTS
3,490,291  1/1970  Fitzpatrick et al................ 74/473 R
3,520,208  7/1970  Davis et al........................ 74/473 R

*Primary Examiner*—Milton Kaufman
*Attorney*—Dexter N. Shaw et al.

[57] ABSTRACT

A shifter is provided for use with an automatic transmission on an automobile to enable the transmission to be shifted in a conventional mode and to enable the transmission to be upshifted quickly in a racing mode upon rapid sequential displacement of a master shift lever. The shifter comprises a stationary frame to which is pivotally connected a slave lever having one end connected to a shift arm on the transmission and having another end releasably connected to the master lever through a selector pin carried on the master lever. The slave lever is provided with a series of stepped surfaces which are selectively engaged by the selector pin to index the slave lever in one direction for upshifting the transmission when the master lever is pivoted sequentially against a stop. There is provided means to arrest pivotal motion of the slave lever at the completion of an upshift to prevent inertia forces on the slave lever from causing it to shift the transmission inadvertently. In each embodiment, there is provided means to bias the selector pin downwardly into engagement with the stepped surfaces for causing the pin to descend the surfaces as upshifting proceeds. In certain of the embodiments, there is provided means to bias the master lever into a home position at the completion of an upshift cycle.

20 Claims, 9 Drawing Figures

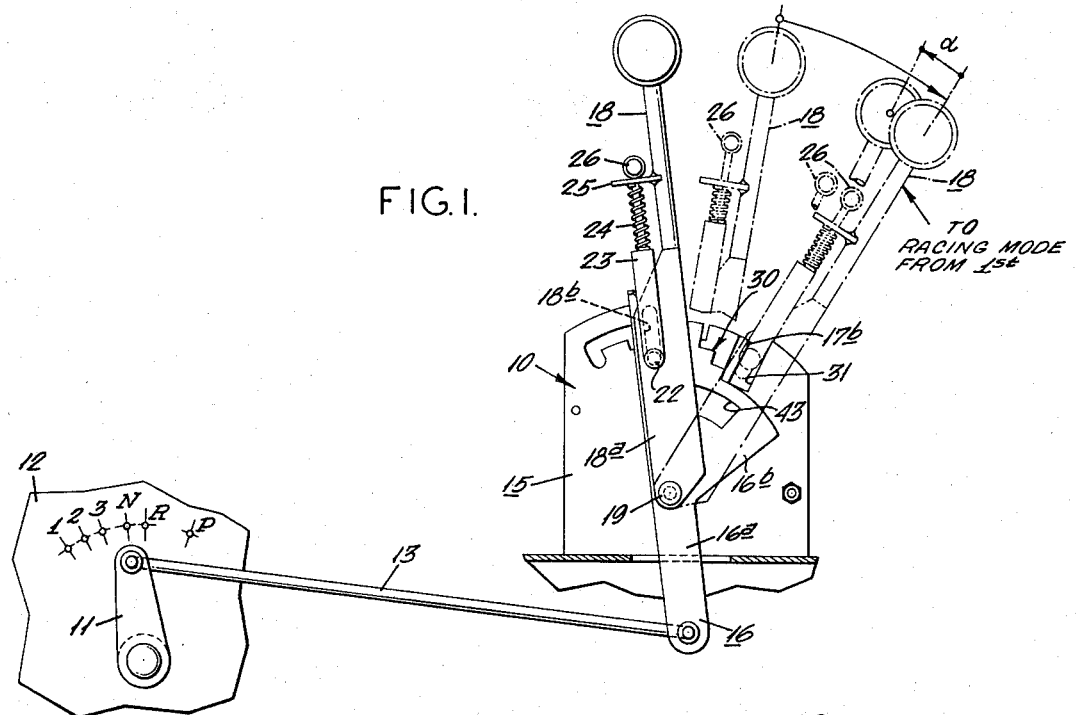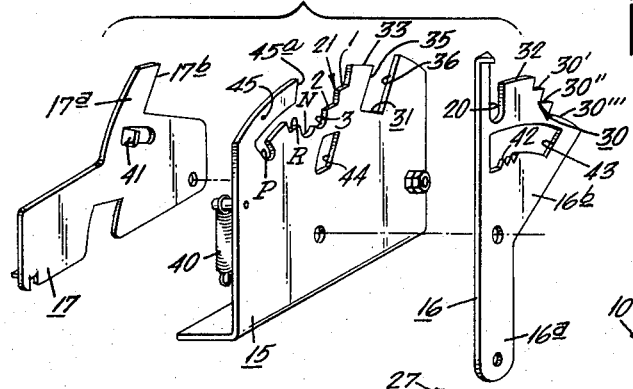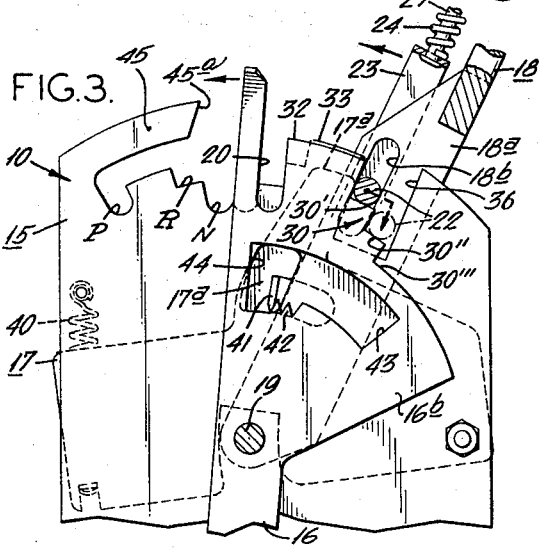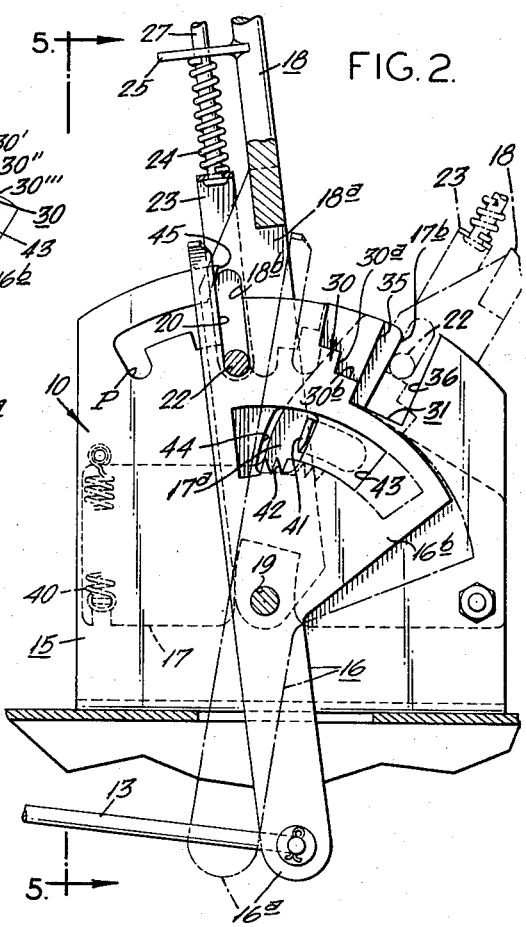

AUTOMATIC TRANSMISSION SHIFTER HAVING CONVENTIONAL MODE AND RACING MODE OPERATIONAL CAPABILITIES

The present invention relates to transmission shifters and more particularly, the present invention relates to shifters for use with automatic automobile transmissions to enable the transmission to be shifted either in a conventional manner or in a rapid-shift manner when racing.

A shifter which has dual-mode shifting capabilities and which is capable of being used with an automatic automobile transmission is disclosed in U.S. Pat. RE. No. 26,844. Although this shifter may operate satisfactorily for its intended purpose, it is not of such simple construction as to be manufactured by low-cost, high-production techniques. Accordingly, a rugged, low-cost shifter having such capabilities is highly desirable.

Another U.S. Pat. No. 3,570,320 discloses a shifter which operates to prevent "overshifting," i.e., shifting beyond a desired speed range when the shift lever is displaced rapidly from a low range to a higher range. Such overshifting is to be avoided in order to prevent abuse of, and possible damage to, the transmission. Although this patented structure prevents "overshifting," it does not possess both conventional mode and racing mode operational capabilities. Moreover, the apparatus of this patent is relatively complex, having a number of parts moving in complex patterns and requiring relatively close clearances to ensure satisfactory operation. Thus, because of its complexity, the apparatus of this patent is not as inexpensive to manufacture as desired. Furthermore, the apparatus possesses wear zones which may cause it to lose its reliability after a prolonged period of operation in severe service conditions.

With the foregoing in mind, it is a primary object of the present invention to provide for automatic automobile transmissions a shifter which has dual-mode capabilities and which is relatively inexpensive to manufacture.

It is another object of the present invention to provide a dual-mode shifter which possesses a minimum of moving parts, yet which is highly reliable in operation.

It is a further object of the present invention to provide a dual-mode shifter which operates when in a racing mode to upshift an automatic transmission upon sequential actuation of a master lever against a stop.

More specifically, in the present invention, an automatic transmission having a shift arm which pivots to effect changes in the speed ranges of the transmission is provided with a shifter which is capable of pivoting the arm in discrete increments upon displacement of a master lever in one direction against a stop when the shifter is in a racing mode, whereby inadvertent overshifting of the transmission is prevented. To this end, the shifter comprises a vertically-disposed stationary plate to which is pivotally mounted a slave lever connected through a linkage to the arm on the transmission. A recess is provided on the other end of the slave lever and a series of stepped surfaces are spaced rearwardly from the recess. A series of stepped locator surfaces corresponding to various transmission settings are provided on the stationary plate and are adapted to register with the recess, and a notch is spaced rearwardly from the locator surfaces to register with the stepped surfaces on the slave lever. The master lever mounts a selector pin which engages the locator surfaces when in the recess to position the slave lever and hence the transmission arm at a desired transmission setting when the master lever is pivoted forwardly or rearwardly in the customary manner. However, in order to place the shifter in the racing mode, the selector pin is disengaged from the recess and locator surfaces, and the master lever is pivoted rearwardly to position the selector pin in the notch for engaging an uppermost one of the stepped surfaces. During upshifting, the selector pin descends the stepped surfaces to engage a lowermost surface at the completion of upshifting. There is provided means to bias the pin downwardly to cause the pin to descend when the master lever is pivoted in a direction opposite from that which causes upshifting. Moreover, there is provided means to arrest motion of the slave lever at the completion of a shift to prevent inertia forces on the slave lever from causing inadvertent upshifting. In one group of embodiments, the master lever is pivoted rearwardly to effect upshifting, and in another group of embodiments, the master lever is pivoted forwardly to effect upshifting. In each group of embodiments, one form of shifter is provided with means to bias the master lever into a home position at the completion of an upshift cycle when in the racing mode.

These and other objects, features and advantages of the present invention should become apparent from the following description when taken in conjunction with the accompanying drawings, in which:

FIG. 1 is a side elevational view of one embodiment of a dual-mode shifter constructed in accordance with the present invention;

FIG. 2 is an enlarged view of the shifter of FIG. 1 illustrating in full lines one position of a master lever when the shifter is in the conventional mode and illustrating in broken lines one position of the master lever when the shifter is in the racing mode;

FIG. 3 is a fragmentary sectional view of the shifter of FIG. 2 illustrating the relative position of its elements when the master lever is pivoted forwardly in the racing mode to effect an upshift;

FIG. 4 is an exploded perspective view of certain of the elements of the shifter of FIG. 1;

Figure 6:
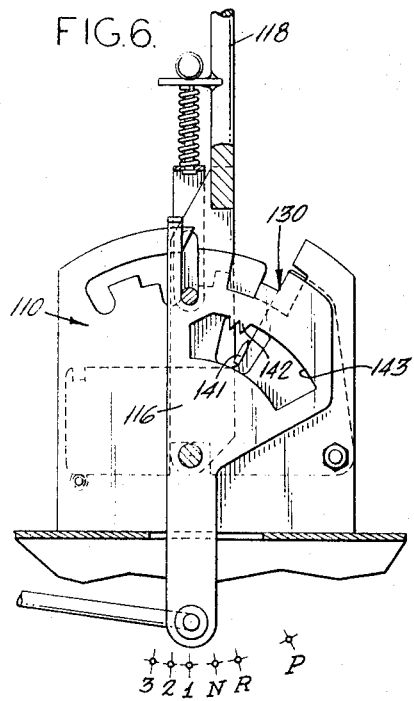
FIG. 6 is a side elevational view of a modified form of the shifter illustrated in FIG. 1.

Referring now to the drawings, there is illustrated in FIG. 1, one embodiment of a shifter 10 constructed according to the present invention. The shifter 10 is mounted in an automobile and is connected to a shift arm 11 on a transmission 12 through a linkage 13. In this embodiment, the transmission 12 is upshifted when its arm 11 is pivoted in the clockwise direction from the position indicated at (1). It is noted at this juncture that in the modified form of this embodiment illustrated in FIG. 6, the transmission shift arm 11 is pivoted in the opposite or counterclockwise direction to effect upshifting.

As best seen in FIGS. 1 and 4, the shifter 10 comprises an upstanding stationary plate 15 mounted to the floor of the automobile, a slave lever 16 pivotally mounted to one side of the plate 15, and a movable latch plate 17 pivotally mounted to the other side of the plate 15. A master lever 18 is also mounted to the stationary plate 15 for pivotal movement in both clockwise and counterclockwise directions. In the illustrated embodiment, the master and slave levers pivot on a common axis normal to the plane of the plate 15, the pivot axis being provided by means of a pivot pin 19 (FIG. 5) located in the lower central portion of the plate 15.

Figure 5:
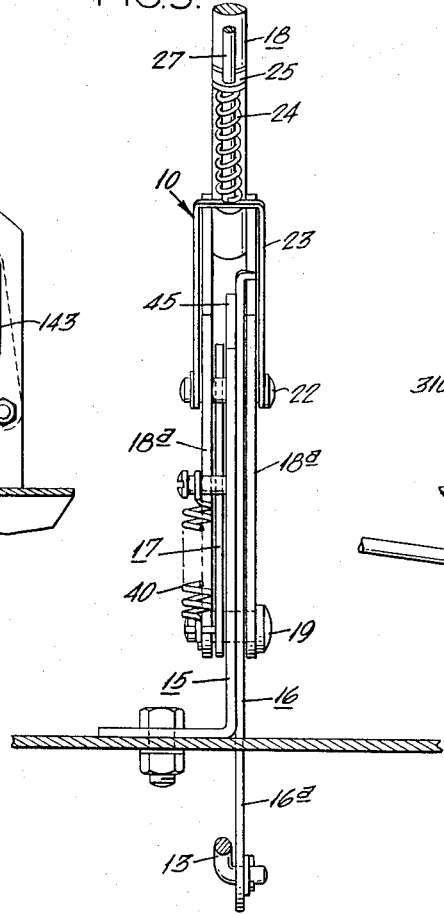
FIG. 5 is an end elevational view taken along section line 5—5 of FIG. 2.

As best seen in FIGS. 2 and 5, the lower end 16a of the slave lever 16 depends below the pin 19 and is connected to the linkage 13. The upper end 16b of the slave lever 16 has a segmental shape and is provided with an upwardly-open depp recess 20 extending in a diametrical line through the pin 19 and the connected lower end 16a of the slave lever 16. It should be noted, however, that the slave lever may be connected at some other location to the shift arm with a cable-type linkage or the like.

The stationary plate 15 has a series of stepped locator surfaces 21 each of which corresponds to a particular transmission setting. For instance, the surfaces 1 and 2 correspond to the low ranges of the transmission; the surface 3 corresponds to the drive range; the surfaces N, R and P correspond to neutral, reverse and park transmission settings, respectively. It is noted that these locator surfaces are arranged in an arc about the pivot axis of the slave lever 16. Thus, the shift arm 11 of the transmission is positioned at a preselected location when the recess 20 registers with a preselected one of the series of locator surfaces 21.

For the purpose of permitting a driver to select the mode of operation of the shifter 10, a selector pin 22 is provided. As best seen in FIGS. 2 and 5, the selector pin 22 is cylindrical and extends transversely to the plane of the plate 15 and into the recess 20 in the slave lever 16. In order to permit the selector pin 22 to be engaged with one or the other of the series of stepped locator surfaces, the pin 22 is mounted for displacement relative to the master lever 18. To this end, the lower end of the master lever 18 has bifurcations 18a,18a which straddle the plates 15, 16 and 17, and an elongated slot 18b,18b is provided in each bifurcation. A yoke or carriage 23 straddles the bifurcations 18a,18a with the selector pin 22 extending into the slots 18b,18b (see FIG. 5). The carriage 23 is biased downwardly by means of a compression spring 24 disposed between the upper end of the carriage 23 and a forward protrusion 25 on the handle 18. A grip 26 (FIG. 1) is located above the protrusion 25 and is connected to the carriage 23 through a stem 27, depending downwardly through the spring 24. With this structure, the selector pin 22 can be lifted and the master lever 18 pivoted forwardly or rearwardly into a desired transmission setting. Of course, when the pin 22 engages the uppermost stepped surface 1, the transmission can be upshifted simply by pivoting the master lever 18 forwardly.

As described thusfar, the shifter operates in the conventional mode in much the same manner as the shifter described in my aforementioned co-pending patent application.

In accordance with the present invention, the shifter 10 operates to upshift the transmission 12 when the master lever 18 is pivoted forwardly and rearwardly through a predetermined arc. To this end, a series of stepped surfaces 30 are provided on the upper end 16b of the slave lever 16, and an upwardly open notch 31 is provided in the stationary plate 15 a spaced distance rearwardly of its stepped surfaces 21. In this embodiment, the stepped surfaces have outwardly-extending rise portions 30a and tread portions 30b disposed at an angle with respect to the rise portions 30a to define bights at their juncture. The tread portions 30b are located at various radial distances from the pivot axis of the slave lever 16, and in the embodiment of FIG. 1, the distances for the tread portions 30b decrease in a clockwise direction from an outermost arcuate pin-guide surface 32 extending from the recess 20 to the stepped surfaces 30. It is also noted that the depth of the notch 31 corresponds to the total rise of the stepped surfaces 30. As best seen in FIG. 4, the stationary plate 15 has a pin-guide surface 33 extending between its stepped surfaces 21 and the notch 31. The pin-guide surfaces 32 and 33 fan with respect to one another as illustrated in FIG. 2 to prevent the selector pin 22 from engaging the stepped surfaces 30 of behind the recess 20 in the slave lever 16 and possibly causing improper shifting. It is noted that the pin-guide surfaces 32 and 33 are located below the upper end of the slots 18b,18b in the master lever bifurcations 18a,18a to enable the selector pin 22 to be disengaged from the recess 20 and positioned in the notch 31, and vice versa.

The shifter 10 is in its racing mode when the master lever 18 is pivoted rearwardly and the selector pin 22 is positioned in the notch 31. As noted heretofore, upshifting of the transmission occurs when the master lever 18 is pivoted forwardly and rearwardly between the limit positions indicated in FIG. 1. Thus, a driver of the automobile is able to upshift without taking his eyes off the roadway.

In the illustrated embodiment, the limit positions are provided by means of an abutment surface 35 extending outwardly along the forward end of the notch 31 and a supplemental abutment surface 36 confronting the surface 35 and extending outwardly along the rear end of the notch 31. The spacing between the abutment surfaces 35 and 36 corresponds substantially to the total spacing between the forwardmost and rearwardmost ones of the rises, and the spacing between the individual rises corresponds substantially to the angular displacement of the slave lever required to effect a single upshift. Thus, as best seen in FIGS. 2 and 3, counterclockwise pivotal movement of the master lever 18 with the selector pin 22 in the notch 31 causes the selector pin 22 to engage the uppermost one 30' of the rises on the slave lever 16 for pivoting the slave lever 16 in the same direction as the master lever 18 until the selector pin 22 engages the abutment surface 35, whereby the slave lever is pivoted through a predetermined increment. For instance, displacement of the master lever 18 from the broken line position illustrated in FIG. 2 to the full line position illustrated in FIG. 3 causes the shift arm 11 on the transmission to pivot in a counterclockwise direction for upshifting from first to second range. In order to prepare for the next upshift from second to drive range, the master lever 18 is pivoted rearwardly into its home position, where the selector pin 22 engages the rear abutment surface 36. During movement into the home position, the spring 24 urges the selector pin 22 downwardly into engagement with the tread 30'' of the next lower step. Thus, forward pivotal movement of the master lever 18 again in the counterclockwise direction causes the slave lever 16 and shift arm 11 on the transmission to pivot in another increment for upshifting the transmission from second to third or drive range. When the master lever 18 is again returned to its home position, the spring 24 urges the selector pin 22 further downwardly to cause it to engage the lowermost rise 30'''. Hence, pivotal movement of the master lever 18 a third time in the counterclockwise direction causes the slave lever 16 and the shift arm 11 on the transmission to be displaced a further increment for upshifting the transmission from drive to neutral range.

In order to bias the master lever 18 into its home position only when the shifter 10 is in the racing mode, there is provided means located adjacent the notch 31 for engaging the selector pin 22 and pivoting the master lever 18 into its home position. To this end, the pivot connection of the latch plate 17 to the stationary plate 15 is located toward the rear of the master and slave levers, and the spring 40 is connected to the stationary plate 15 forwardly of the master and slave lever pivot pin 19. The latch plate 17 has an upwardly-projecting ear of spur 17a which has a straight edge 17b normally extending in parallel relation with the front abutment surface 35 of the notch 31 (See FIG. 2). The edge 17b is coextensive with the abutment surface 35. Thus, when the master lever 18 is pivoted forwardly (counterclockwise in FIG. 2) from the broken line position therein to the full line position in FIG. 3, the selector pin 22 engages the edge 17b to pivot the latch plate 17 in the counterclockwise direction. As the latch plate 17 pivots, the spring 40 extends so that when forward pressure on the master lever 18 is released at the completion of an upshift, the spring 40 pivots the latch plate 17 and hence the master lever 18 in the opposite or clockwise direction to return the master lever 18 to its home position in preparation for the next upshift.

As noted in my aforementioned patent application, rapid actuation of a shifter such as encountered during racing, can induce inertia forces of considerable magnitude in its moving parts. In the present invention, there would be a tendency for the slave lever 16 to continue to pivot in a counterclockwise direction after the selector pin 22 engages the forward limit surface 35 and movement of the master lever 18 is arrested. In order to prevent inertia forces on the slave lever 16 from overshifting the transmission, there is provided means to arrest motion of the slave lever 16 at the completion of an upshift. In the embodiment illustrated in FIGS. 1-5, the motion arresting means includes cooperating latching means on the slave lever 16 and the latching plate 17. As best seen in FIGS. 2, 3 and 4, the latching means includes a pawl 41 struck from the latch plate 17 and a series of teeth 42 projecting upwardly into an aperture 43 in the slave lever 16. The pawl 41 extends through an aperture 44 in the stationary plate 15. The teeth 42 are arranged in the aperture 44 in such a way as to be engaged by the pawl 41 at the completion of an upshift, for instance, as illustrated in FIG. 3 at the completion of the upshift from first to second range. Thus, as the master lever 18 pivots forwardly the latch plate 17 also pivots to cause the pawl to move downwardly into the path of movement of the teeth 42 for arresting motion of the slave lever 16. It is noted that in addition to biasing the master lever 18 into its home position, the spring 40 normally spaces the pawl 41 from the teeth 42. By virtue of this structure, it should be apparent that possible overshifting of the transmission due to inertia is prevented.

In using the shifter of FIGS. 1-5, in the conventional manner, the selector pin 22 is engaged in the recess 20, and the master lever 18 is pivoted forwardly or rearwardly, with the position of the selector pin 22 being adjusted by the driver depending on the desired transmission range setting. When it is desired to place the shifter 10 in the racing mode, for example immediately prior to racing, the grip 26 is lifted, and the master lever 18 is pivoted rearwardly until the selector pin 22 rests on the stepped surface 1 on the stationary plate 15. The transmission is thereby placed in low or first range, and the stepped surfaces 30 on the slave lever 16 are placed in proper registry with the notch s1 to be ready to engage the selector pin 22 when the transmission is placed in the racing mode. It should be noted that if desired, the pin 22 may be engaged with one of the other locator surfaces, for instance surface 2 in the event that the driver wishes to upshift rapidly from only second to drive.

In order to place the transmission in the racing mode, the grip 26 is lifted into its upper limit position, and the master lever 18 is pivoted further rearwardly until the selector pin 22 registers in the notch 31. When the grip 26 is released by the driver, the selector pin 22 engages the uppermost stepped surface 30'. As noted in a preceding paragraph, pivotal movement of the master lever 18 sequentially in the forward direction causes the slave lever 16 to index from low through second and drive ranges, and into the neutral range position if desired. It is noted that the abutment surface 36 projects upwardly beyond the pin-guide surfaces 32 and 33 and into the path of movement of the selector pin 22 to provide a rearward limit for the master lever 18 during the transition from the conventional to the racing mode. In addition, the plate 15 has a rearwardly-extending finger 45 which overlies the park (P) and reverse (R) locator surfaces and which has a forward limit surface 45a partially overlying the neutral surface N. The surface 45a is inclined with respect to the path of movement of the selector pin 22 and operates to cam the selector pin 22 downwardly onto the neutral surface N when the master lever 18 is pivoted forwardly during the transition from the facing mode to the conventional mode. The finger 45 operates to prevent the selector pin 22 from being disengaged from the recess 20 when the transmission is not in neutral or in a forward drive range. As a result, it it not possible for the selector pin 20 to be engaged inadvertently behind the slave lever 16 and possibly causing an improper shift.

As noted heretofore, certain automatic transmissions have so-called "reverse" patterns in that their shift arms pivot in a counterclockwise direction to effect upshifting. In order to provide a shifter which is capable of being used with such automatic transmissions, the shifter 110 in the embodiment illustrated in FIG. 6 is disclosed. This embodiment is generally similar to the embodiment of FIGS. 1-5 except for the fact that the master lever 118 is pivoted in a rearward or clockwise direction to effect upshifts and the stepped surfaces 130 on the slave lever 116 ascend in a clockwise direction to cause the slave lever 116 to pivot in the same direction as the master lever 118. In this embodiment, the teeth 142 depend downwardly into the aperture 142 in the slave lever 116, and the pawl 141 projects upwardly theretoward, the latch plate also pivoting in the clockwise direction when the master lever is pivoted rearwardly. This embodiment of the shifter operates in the same manner as the aforedescribed embodiment, except for the differences in the direction of motion of the various parts.

Figure 9:
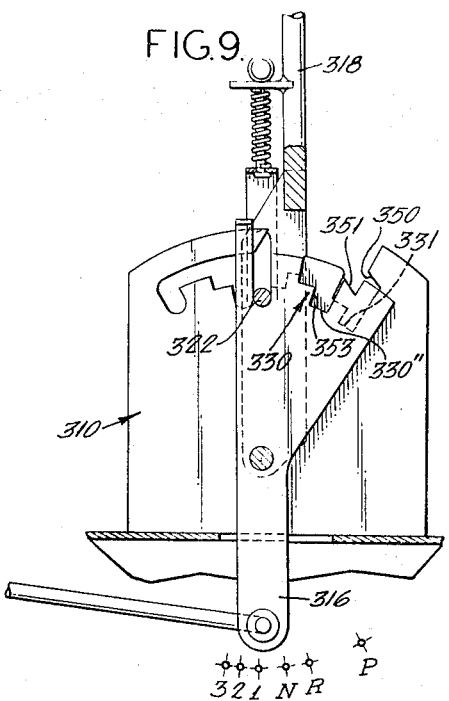
FIG. 9 is a side elevational view of a different form of the modified shifter illustrated in FIG. 7.
Figure 8:
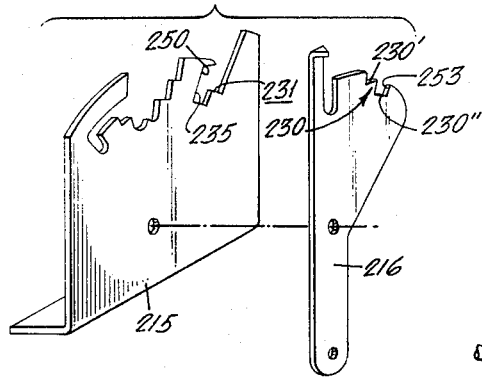
FIG. 8 is an exploded perspective view similar to FIG. 4, but of certain of the elements of the shifter of FIG. 7.
Figure 7:
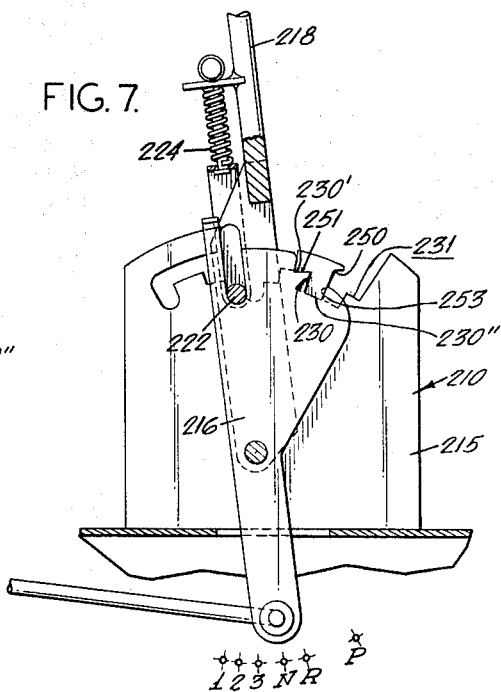
FIG. 7 is a side elevational view of another embodiment of a shifter constructed according to the present invention.

Other modified embodiments of shifters are illustrated in FIGS. 7, 8 and 9. The shifter 210 illustrated in FIGS. 7 and 8 corresponds generally to the shifter 10 illustrated in FIGS. 1–5, since pivotal movement of the master lever 218 in a forward direction causes the transmission to upshift. The shifter 310 illustrated in FIG. 9 corresponds to the embodiment illustrated in FIG. 6 since rearward pivotal movement of the master lever causes the transmission to upshift. In both of these embodiments, however, the shifter does not permit upshifting into neutral when in the racing mode.

Referring now to the embodiment illustrated in FIGS. 7 and 8, the shifter 210 differs from the shifters 10 and 110 in that a latching plate is eliminated (compare FIG. 7 with FIG. 4); the master lever 218 is not biased into a home position; and the shifter 210 is incapable of being shifted into neutral when in its racing mode. In this embodiment, the stepped surfaces 230 on the slave lever 216 ascend in the counterclockwise direction, and motion of the slave lever 216 at the completion of an upshift is arrested by means of cooperating latching surfaces 250 and 251 which are inclined with respect to the path of movement of the selector pin 222 and which operate to arrest motion of the slave lever 16 when the selector pin 222 engages between the surfaces at the completion of the upshift from first to second range. As best seen in FIG. 7, the surface 250 is provided by an ear which projects rearwardly into the notch 231 in the stationary plate 215, and the surface 251 is inclined on the uppermost tread 230'. Another latching surface 253 is provided on a heel on the slave lever 216 and extends outwardly from the lowermost tread 230''. The latching surface 253 operates to jam the selector pin 222 against the abutment surface 235 (FIG. 8) to arrest motion of the slave lever 216 at the completion of the upshift from second to drive range.

In this embodiment, the conventional operation of the shifter 310 is the same as in both of the aforementioned embodiments. However, when initially placed in the racing mode the selector pin 222 engages the upper stepped surface 230' during the upshift from first to second range, and the selector pin drops onto the lower stepped surface 230'' under the urging of the spring 224 for the upshift from second to drive range. It is noted that although there is a slight inclination of the surface 251, the slave lever 216 remains stationary at the completion of an upshift due to the interaction of internal detents in the transmission while permitting the master lever 218 to be moved rearwardly for engaging the selector pin 222 with the surface 230'' preparatory to the succeeding upshift. Moreover, the absence of biasing means for the master lever 218 requires the driver to pivot the master lever 218 positively in the rearward direction at the completion of an upshift in preparation for a succeeding upshift. It is noted that, if desired, a toggle spring (not shown) may be connected between the master lever 218 and its pivot axis in order to bias the master lever into a home position.

The embodiment illustrated in FIG. 9 is similar in construction to the embodiment of FIGS. 7 and 8; however, displacement of the master lever 318 in the rearward direction causes upshifting. In this embodiment, the stepped surfaces 330 on the slave lever 316 ascend in the clockwise direction from a lower tread 330''. The latching surfaces 350 and 351 incline into the notch 331 in directions opposite to the latching surfaces 250 and 251 in the FIG. 7 embodiment, and the selector pin 322 is engaged between the latching surfaces 350 and 351 when the master lever 318 is in its rearward limit position at the completion of the upshift from first to second range. The surface 353 on the heel of the slave lever 316 operates to arrest motion of the slave lever 316 at the completion of an upshift into drive range in the same manner as the surface 253 operates in the FIG. 7 embodiment. Thus, it should be apparent that the embodiments of FIGS. 7 and 9 operate in much the same manner as the embodiments of FIG. 1 and 6 but require fewer parts and hence are even more economical to manufacture.

In view of the foregoing, it should be apparent that there has now been provided improved automatic transmission shifters which have dual mode capabilities, which are rugged and reliable, and which are economical to manufacture.

While preferred embodiments of the present invention have been described in detail, various modifications, alterations and changes may be made without departing from the spirit and scope of the present invention as defined in the appended claims. Having thus described the invention:

I Claim:

1. A dual mode shifter for use with an automatic transmission having a shift arm, comprising:
   a stationary plate having a series of locator surfaces corresponding to various transmission speed settings including first, second and drive ranges;
   a master shift lever pivotally mounted to said plate for displacement in a single plane;
   a slave shift lever pivotally mounted to said plate and adapted to be connected to said shift arm on the transmission, said slave lever having surface means including a recess adapted to register with a selected one of said locator surfaces and a series of stepped surfaces spaced from said recess;
   selector means including a selector pin mounted to move relative to said master lever for engagement with said selected locator surfaces when engaged in said recess and for engagement with a selected one of said series of stepped surfaces;
   stop means on said stationary plate for limiting displacement of said master lever in one direction when said selector means is engaged with one of said series of stepped surfaces and for limiting displacement of said master lever in the opposite direction, whereby displacement of the master lever alternately against the stop means causes the slave lever and the shift arm on the transmission to pivot in increments.

2. Apparatus according to claim 1 including means connected to said pin for biasing said pin into engagement with said recess and said series of stepped surfaces, and operating means carried on said master lever for displacing said pin against its bias for engaging said pin selectively with said recess and said series of stepped surfaces.

3. Apparatus according to claim 2 wherein said master shift lever has a lower portion with bifurcations straddling said stationary plate and an elongated slot in each bifurcation, said operating means including a carriage mounting said selector pin transversely to said plane and in said slots, grip means to displace said carriage relative to said master lever, and a spring mounted on said master lever and engaging said carriage for urging said pin into a limit position in the slots.

4. Apparatus according to claim 1 wherein said pin is disposed transversely to said plane and said stop means includes a notch in said stationary plate providing an abutment surface spaced from said locator surfaces on said plate and located in the path of movement of said pin when said pin is engaged with one of said series of stepped surfaces and said master lever is displaced in said one direction.

5. Apparatus according to claim 4 wherein said stop means includes a supplemental abutment surface provided by said notch in said stationary plate for limiting displacement of said master lever in said opposite direction, said supplemental abutment surface being spaced from said first-mentioned abutment surface in the path of movement of said selector means in said opposite direction.

6. Apparatus according to claim 1 wherein said master and slave levers pivot on a common axis and one of said locator surfaces corresponds to a neutral transmission setting, said locator surfaces corresponding to said first and second ranges ascending in stepped fashion outwardly from said pivot axis and terminating in an arcuate pin-guide surface located a predetermined radial distance from said common pivot axis, said slave lever having a similar arcuate pin-guide surface also located at said distance and extending between the recess and the stepped surfaces on said slave lever, said pin-guide surfaces cooperating to prevent the selector pin from being inadvertently engaged with the stepped surfaces of the slave lever when said pin is disengaged from said recess in said slave lever.

7. Apparatus according to claim 6 including a pair of limit surfaces located beyond said predetermined distance, said limit surfaces confronting one another in spaced relation in the path of movement of said selector pin when said selector pin is disengaged from both said slave lever recess and said stepped surfaces and said master lever is pivoted in alternate directions, whereby said selector pin engages said limit surfaces to limit pivotal movement of said master lever about its pivot axis.

8. Apparatus according to claim 1 including means engageable by said selector pin and operable when said selector pin is engaged with one of the stepped surfaces on said slave lever to bias said master lever in said opposite direction and away from one of said stop means for disengaging said selector pin from its engaged stepped surface on the slave lever at the completion of an upshift.

9. Apparatus according to claim 8 wherein said master lever biasing means includes a movable plate pivotally mounted to and alongside said stationary plate, said movable plate having an ear displaceable into and out of registry with said one stop means on said stationary plate, and a spring member connected to said movable plate and said stationary plate to pivot said movable plate on its axis for normally maintaining said ear out of registry with said stop means so that said pin engages said ear before engaging said one stop means, whereby the master lever is urged away from the one stop means at the completion of an upshift.

10. Apparatus according to claim 1 wherein the stepped surfaces on said slave lever have rise portions extending outwardly from the pivot axis of the slave lever and tread portions disposed at an angle with respect to said rise portions to define a series of bights, said bights being selectively engageable by said selector pin to cause said slave lever to pivot in the same direction as the master lever, and including means to arrest motion of the slave lever at the completion of an upshift between said ranges.

11. Apparatus according to claim 10 wherein said stop means includes an abutment surface extending outwardly from the pivot axis of the slave lever for a distance corresponding substantially to the total extension of the rise portions of the stepped surfaces so that said selector pin engages said abutment surface when said master lever is pivoted in said one direction to complete an upshift, each tread being dimensioned between the rise portions of the stepped surfaces an amount corresponding to the amount of pivotal movement of the slave lever required to effect an upshift between each range.

12. Apparatus according to claim 11 wherein said motion arresting means includes a tab on said stationary plate having an inclined surface disposed at an angle to said abutment surface and in the path of movement of the selector pin and a similarly inclined surface on one of said treads, said selector pin being cylindrical and being engaged between said inclined surfaces at the completion of an upshift from first to second ranges to arrest motion of the slave lever.

13. Apparatus according to claim 12 wherein said tread having said inclined surface is located outwardly of said pivot axis further than an inner one of said treads, said outer tread corresponding to said first speed range, and including a heel extending outwardly from the pivot axis of the slave lever in confronting spaced relation with the rise portion associated with said inner tread, so that said selector pin is engaged between said heel and said abutment surface at the completion of an upshift from second to drive ranges to arrest motion of the slave lever.

14. Apparatus according to claim 10 wherein said motion arresting means includes a latch plate pivotally mounted to said stationary plate, said latch plate having an ear engageable by said selector pin to displace said latch plate in the same direction as the slave lever, and cooperative latching means on said latch plate and said slave lever engageable upon displacement of said master lever through a predetermined arc to arrest motion of the slave lever.

15. Apparatus according to claim 14 wherein said latching means includes a pawl on said latch plate and a series of teeth on said slave lever, said pawl being displaceable into the path of movement of said teeth to engage at least one thereof upon pivotal movement of said master lever.

16. Apparatus according to claim 15 wherein said latch plate is mounted on one side of said stationary plate and said slave lever is mounted on the other side of said stationary plate, said stationary plate having an aperture with said pawl extending through said aperture into operating relation with said teeth on said slave lever, and including a spring member connected to said latch plate and said stationary plate for normally spacing said pawl from said teeth.

17. Apparatus according to claim 16 wherein said slave lever has an aperture in registry with the aperture in said stationary plate and said teeth are formed on said slave lever and extend into its aperture.

18. Apparatus according to claim 17 wherein said tread portions are located at predetermined radial distances increasing in said one direction about said slave lever pivot axis so that pivotal movement of the master lever in said one direction causes the slave lever and latching plate to move in the same direction for effecting an upshift with said spring member operating to pivot said latching plate and master lever in the opposite direction for causing the selector pin to disengage the tread of one bight and to engage the tread of another bight.

19. Apparatus according to claim 18 wherein said one direction is clockwise, said teeth depend downwardly into the aperture in the slave lever with said pawl projecting upwardly toward said teeth.

20. Apparatus according to claim 18 wherein said one direction is counterclockwise and said teeth project upwardly into the aperture in the slave lever with the pawl depending downwardly toward said teeth.

* * * * *